United States Patent [19]

Tachibana

[11] Patent Number: 4,970,189

[45] Date of Patent: Nov. 13, 1990

[54] POROUS, METAL-CONTAINING CARBONACEOUS MATERIAL

[75] Inventor: Masao Tachibana, Koshigaya, Japan

[73] Assignee: Somar Corporation, Japan

[21] Appl. No.: 370,020

[22] Filed: Jun. 23, 1989

[30] Foreign Application Priority Data

Jun. 24, 1988 [JP] Japan .................. 63-154893

[51] Int. Cl.$^5$ .................. B01J 20/20; B01J 21/18
[52] U.S. Cl. .................. 502/183; 502/182; 502/184; 502/185; 502/423
[58] Field of Search .............. 502/182, 183, 184, 185, 502/423

[56] References Cited

U.S. PATENT DOCUMENTS

| | | | |
|---|---|---|---|
| 2,282,602 | 5/1942 | Drennan | 502/182 X |
| 3,784,412 | 1/1974 | Mund et al. | 502/182 X |
| 4,242,226 | 12/1980 | Siren | 502/423 X |
| 4,447,665 | 5/1984 | Wennerberg | 502/182 X |
| 4,482,641 | 11/1984 | Wennerberg | 502/182 |
| 4,513,096 | 4/1985 | Connolly et al. | 502/185 |
| 4,518,488 | 5/1985 | Wennerberg | 502/185 X |
| 4,656,153 | 4/1987 | Wennerberg | 502/185 X |

FOREIGN PATENT DOCUMENTS

| | | | |
|---|---|---|---|
| 3342508 | 6/1985 | Fed. Rep. of Germany | 502/182 |
| 507524 | 1/1974 | U.S.S.R. | 502/423 |

Primary Examiner—Patrick P. Garvin
Attorney, Agent, or Firm—Lorusso & Loud

[57] ABSTRACT

A porous, metal-containing carbonaceous material is disclosed which comprises a porous, carbonaceous body, and fine particles of a metal having an average particle size of 1 μm or less and dispersed in the carbonaceous body. The carbonaceous material may be obtained by a method including the steps of: (a) providing finely divided particles of a metal oxide having an average particle size of 1 μm or less; (b) mixing the particles with an organic substance to obtain a mixture; and (c) carbonizing the mixture in a non-oxidizing atmosphere to convert the organic substance into a porous carbonaceous body and to convert the metal oxide particles into elemental metal particles dispersed in the carbonaceous body.

12 Claims, No Drawings

POROUS, METAL-CONTAINING CARBONACEOUS MATERIAL

This invention relates to a porous, metal-containing carbonaceous material and to a method of preparing same.

Porous carbonaceous materials such as activated carbon and carbon fibers are now used in a variety of fields as gas absorbents, water treatment materials, filters, catalysts, etc. Composite carbonaceous materials are also known in which metal compounds such as metal oxides deposit on inside surfaces of pores of carbonaceous bodies. Such a composite material is prepared by impregnating a carbonaceous body with a solution containing a metal oxide.

The present invention is aimed at the provision of a novel, porous, carbonaceous material containing fine particulate of an elemental metal, which material can exhibit significantly high activities distinctive from the above-mentioned known composite material.

In accordance with one aspect of the present invention there is provided a method of producing a porous, metal-containing carbonaceous material, comprising the steps of:

(a) providing finely divided particles of a metal oxide having an average particle size of 1 $\mu$m or less;

(b) mixing said particles with an organic substance to obtain a mixture; and (c) carbonizing said mixture in a non-oxidizing atmosphere to convert said organic substance into a porous carbonaceous body and to convert said metal oxide particles into elemental metal particles dispersed in said carbonaceous body.

In another aspect, the present invention provides a porous, metal-containing carbonaceous material obtained by the the above method.

The present invention also provides a porous, metal-containing carbonaceous material comprising a porous, carbonaceous body, and fine particles of a metal having an average particle size of 1 $\mu$m or less and dispersed in said carbonaceous body.

The present invention will now be described in detail below.

The carbonaceous material according to the present invention may be prepared by the following method. First, finely divided metal oxide with a particle size of 1 $\mu$m or less is mixed with an organic substance.

The metal oxide is generally an oxide of one or more metals of Group Ib, IIa, IIb, IIIa, IIIb, IVa, IVb, Va, Vb, VIa, VIIa or VIII of the Periodic Table. Of these, the use of a metal oxide capable of being easily converted into elemental metal upon being heated in the presence of a reducing agent such as hydrogen gas, carbon monoxide or carbon is desirable. Illustrative of suitable metal oxides are those of a metal selected from the group consisting of Ag, Cu, Ca, Mg, Ba, Zn, Al, Ga, Ti, Zr, Sn, V, Sb, Cr, Mo, Fe, Co, Ni and mixtures thereof. The kind of the metal oxide is determined according to the object of use of the carbonaceous material.

It is preferred that the metal oxide have an average particle size of 300 Å or less. In this case, for reasons of excellent homogeneity in dispersion of the metal oxide in the organic substance, it is also preferred that the metal oxide particles are each covered with a layer of an anion surfactant, such as a monomolecular layer of a fatty acid metal salt. Such a super-fine metal oxide may be obtained by a method disclosed in Japanese Unexamined Patent Application (Tokkyo Kokai) Nos. 60-231,798, 62-83305 and 62-138,333.

Any organic substance may be used for the purpose of the present invention as long as it can give a porous carbonaceous or carbon body upon heated in a non-oxidizing condition. Illustrative of suitable organic substances are phenol resins, epoxy resins, urea resins, formalin resins, vinyl chloride resins, acrylic resins, styrene resins, polyamide resins, polyvinyl alcohol resins, polyethylene resins, polypropylene resins, petroleum pitch, coal tar pitch, asphalt, wood chips, pulp, coconut husk, rice hull, sugars, starch, coal particles and coke powder.

In the case of an organic substance available as powder, such as pulp powder, coal powder, coke powder or thermosetting resin powder, it is advisable to mix the powder with the finely divided metal oxide in the presence of a binder and, if necessary, water, and to shape the resulting mixture into pellets, cylinders, sheets or any other desired forms. As the binder may be used, for example, sulfite pulp liquor, molasses, avicel, soft pitch, coal tar, carboxymethyl cellulose or polyvinyl alcohol.

In the case of a thermally fusible organic substance, such as petroleum pitch, coal tar pitch or asphalt, it is advisable to mix the finely divided metal oxide with the molten organic substance with heating. The resulting mixture is preferably further heat treated to increase its softening point and is then shaped into pellets, fibers or any other desired form.

The mixture of the finely divided metal oxide with the organic substance is carbonized at a temperature and for a period of time sufficient to convert the organic substance into a porous carbonaceous body and to covert the metal oxide into the elemental metal. The carbonization is generally performed at a temperature of 800°–1000° C. During the course of the carbonization, the organic substance is thermally decomposed to form a reducing gas such as hydrogen or carbon monoxide which serves to reduce the metal oxide into the elemental metal. The carbon produced also serves as a reducing agent. The carbonization is carried out in a non-oxidizing atmosphere such as in the atmosphere of nitrogen, carbon dioxide, a combustion gas or steam. As long as the organic substance is prevented from burning, a small amount of oxygen may be present in the atmosphere in which the carbonization is effected.

As a result of the carbonization, there is obtained a porous, carbonaceous body of an open cellular structure having dispersed therein fine particles of a metal having an average particle size of 1 $\mu$m or less. The content of the elemental metal is generally 5–50% based on the total weight of the elemental metal and the carbonaceous body.

When the particulate metal oxide used as a starting material has a surface layer of an anion surfactant, the resulting elemental metal particles each have a carbon layer formed as a result of the carbonization of the anion surfactant. The carbon layer has a multiplicity of cracks. The elemental metal particles coated with the carbon layer are homogeneously dispersed in the matrix of carbon derived from the organic substance.

The porous, carbonaceous material according to the present invention may be formed into metal-containing activated carbon by heat treatment in steam.

Because of the presence of super-fine elemental metal particles, the porous carbonaceous material according to the present invention has a high activity and lends itself to various applications according to the kind of the metal. For example, the material containing a transition metal such as Fe, Cu or Co can be utilized as an oxygen absorbent when used in conjunction with a suitable electrolyte such as sodium chloride. The material of the present invention containing V, Ni, Mo or the like catalytic metal can be suitably used as a lipophilic catalyst for, for example, hydrogenation of an organic substance. When processed to form activated carbon, the material of the present invention is advantageously used as a gas absorbent for the treatment of a gas containing hydrogen chloride or sulfur dioxide. The porous material according to the present invention containing an electrically conductive metal such as Cu or Ag may be used as an electromagnetic interference shield material. When a ferromagnetic metal is used, the porous carbonaceous material can be used as a material having both electromagnetic interference shield property and a radio wave absorbing property.

The following example will further illustrate the present invention.

EXAMPLE 1

Coal powder (100 parts by weight) having an particle size of 200 mesh (Tyler) or finer was mixed with 50 parts by weight of ferric oxide powder (coated with monomolecular layer of potassium stearate, average particle size of about 50 Å) and 30 parts by weight of soft pitch (softening point: about 50° C.). The mixture was kneaded at 75° C. and cooled to obtain blocks. The blocks were heated to 850° C. at a rate of 10° C./minute in a non-oxidizing atmosphere and maintained at that temperature for 30 minutes to obtain a carbonized product. After cooling in the atmosphere of nitrogen, the carbonized product was ground into particles. The chemical analysis revealed that the iron oxide was converted into metallic iron. The microscopic observation showed that the metallic iron particulate was homogeneously dispersed in the carbon matrix.

The thus obtained metallic iron-containing carbon particles (100 parts by weight) were mixed with 30 parts by weight of an aqueous sodium chloride solution (concentration: 15%) to obtain an oxygen absorbent. This absorbent (10 g) was placed in a 100 cc vessel and the vessel was sealed. After standing for 24 hours, the oxygen content in the vessel was measured. No oxygen was detected.

I claim:

1. A method of producing a porous, metal-containing carbonaceous material, comprising the steps of:
   (a) providing finely divided particles of a metal oxide having an average particle size of 1 μm or less;
   (b) coating said particles with an anionic surfactant;
   (c) mixing said coated particles with an organic substance to obtain a mixture; and
   (d) carbonizing said mixture in a non-oxidizing atmosphere to convert said organic substance into a porous carbonaceous body and to convert said metal oxide particles into elemental metal particles dispersed in said carbonaceous body.

2. A method as claimed in claim 1, wherein said metal oxide is an oxide of one or more metals of Group Ib, IIa, IIb, IIIa, IIIb, IVa, IVb, Va, Vb, VIa, VIIa or VIII.

3. A method as claimed in claim 2, wherein said metal oxide is an oxide of a metal selected from the group consisting of Ag, Cu, Ca, Mg, Ba, Zn, Al, Ga, Ti, Zr, Sn, V, Sb, Cr, Mo, Fe, Co, Ni and mixtures thereof.

4. A method as claimed in claim 2, wherein said metal oxide has an average particle size of 300 Å or less.

5. A method as claimed in claim 1, wherein said coating forms a monomolecular layer and wherein said anionic surfactant is a fatty acid metal salt.

6. A method as claimed in claim 1, wherein said organic substance is at least one member selected from the group consisting of phenol resins, epoxy resins, urea resins, formalin resins, vinyl chloride resins, acrylic resins, styrene resins, polyamide resins, polyvinyl alcohol resins, polyethylene resins, polypropylene resins, petroleum pitch, coal tar pitch, asphalt, wood chips, pulp, coconut husk, rice hull, sugars, starch, coal particles and coke powder.

7. A method as claimed in claim 1, wherein said mixture is formed into a shaped body before step (c).

8. A method as claimed in claim 7, wherein said shaped body is a pellet.

9. A method as claimed in claim 1, wherein step (c) is performed at a temperature of 800°–1000° C.

10. A method as claimed in claim 1, wherein step (c) is performed in the atmosphere of nitrogen, carbon dioxide, a combustion gas or steam.

11. A method as claimed in claim 1, wherein said mixture has such a content of said metal oxide that the amount of said elemental metal is 5–60% based on the total weight of said elemental metal and said carbonaceous body.

12. A porous, metal-containing carbonaceous material produced by the process of claim 1 and comprising a porous, carbonaceuous body, and fine particles of a metal having an average particle size of 1 μm or less and dispersed in said carbonaceuous body, wherein each metal particle is individually coated with a carbon layer, said carbon layer having a multiplicity of cracks.

* * * * *